(12) United States Patent
Huang et al.

(10) Patent No.: US 11,854,422 B2
(45) Date of Patent: Dec. 26, 2023

(54) METHOD AND DEVICE FOR INFORMATION INTERACTION

(71) Applicant: BEIJING BYTEDANCE NETWORK TECHNOLOGY CO., LTD., Beijing (CN)

(72) Inventors: Haoran Huang, Beijing (CN); Xi Luo, Beijing (CN); Fuxiang Li, Beijing (CN); Hang Li, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

(21) Appl. No.: 17/888,258

(22) Filed: Aug. 15, 2022

(65) Prior Publication Data

US 2023/0081000 A1 Mar. 16, 2023

Related U.S. Application Data

(63) Continuation of application No. PCT/CN2021/078186, filed on Feb. 26, 2021.

(30) Foreign Application Priority Data

Feb. 26, 2020 (CN) .......................... 202010120450.X (51) Int. Cl.
*G09B 5/02* (2006.01)
*G09B 19/06* (2006.01)
*G09B 5/06* (2006.01)

(52) U.S. Cl.
CPC ............. *G09B 19/06* (2013.01); *G09B 5/065* (2013.01)

(58) Field of Classification Search
CPC ........ G09B 19/06; G09B 5/065; G09B 19/02; G06F 16/335; G06F 16/3343
See application file for complete search history.

(56) References Cited

U.S. PATENT DOCUMENTS 10,102,844 B1 * 10/2018 Mois .................... G06F 16/3329
10,241,752 B2 * 3/2019 Lemay ................... G06Q 30/02
(Continued)

FOREIGN PATENT DOCUMENTS

CN     105741831 A    7/2016
CN     106407333 A    2/2017
(Continued)

OTHER PUBLICATIONS

International Patent Application No. PCT/CN2021/078186; Int'l Written Opinion and Search Report; dated Jun. 2, 2021; 9 pages.
(Continued)

*Primary Examiner* — Masud Ahmed
(74) *Attorney, Agent, or Firm* — BakerHostetler (57) ABSTRACT

A method and a device for information interaction. The method comprises: in response to receiving an oral practice request initiated by a user, outputting task information for indicating a target oral practice task (201), wherein the task information corresponds to task intention information and task keyword information; acquiring voice information inputted by the user with regard to the task information (202); recognizing the voice information, so as to determine user intention information and user keyword information corresponding to the user (203); generating a matching result for indicating whether the user has completed the target oral practice task (204), wherein the matching result is obtained by the following step: respectively matching the user intention information with the task intention information, and the user keyword information with the task keyword information, so as to obtain the matching result; and presenting the matching result to the user (205).

16 Claims, 6 Drawing Sheets

(56) References Cited

U.S. PATENT DOCUMENTS

| | | | | |
|---|---|---|---|---|
| 10,489,393 | B1* | 11/2019 | Mittal | G06F 16/2455 |
| 10,755,051 | B2* | 8/2020 | Piernot | G06F 40/30 |
| 2002/0156830 | A1* | 10/2002 | Gayama | H04L 9/40 |
| | | | | 704/E15.044 |
| 2009/0006345 | A1* | 1/2009 | Platt | G06F 40/274 |
| 2012/0290300 | A1 | 11/2012 | Lee et al. | |
| 2015/0052128 | A1* | 2/2015 | Sharifi | G06F 16/433 |
| | | | | 707/727 |
| 2018/0115645 | A1* | 4/2018 | Iyer | G06Q 10/063112 |
| 2020/0005767 | A1* | 1/2020 | Ye | G06F 9/542 |

FOREIGN PATENT DOCUMENTS

| | | |
|---|---|---|
| CN | 108831503 A | 11/2018 |
| CN | 109039647 A | 12/2018 |
| CN | 112307162 A | 2/2021 |
| JP | 2005-106876 A | 4/2005 |
| JP | 2005-274830 A | 10/2005 |
| JP | 2007-147783 A | 6/2007 |
| JP | 2012-255866 A | 12/2012 |
| JP | 2013-512461 A | 4/2013 |
| WO | WO 2013/172707 A2 | 11/2013 |
| WO | WO 2015/184186 A1 | 12/2015 |

OTHER PUBLICATIONS

European Patent Application No. 21759798.8; Extended Search Report; dated Jun. 22, 2023; 12 pages.

* cited by examiner

METHOD AND DEVICE FOR INFORMATION INTERACTION

CROSS REFERENCE OF RELATED APPLICATION

The present application is a continuation application of International Patent Application No. PCT/CN2021/078186, titled "METHOD AND DEVICE FOR INFORMATION INTERACTION", filed on Feb. 26, 2021, which claims priority to Chinese Patent Application No. 202010120450.X, filed on Feb. 26, 2020, with the China National Intellectual Property Administration, both of which are incorporated herein by reference in their entireties.

FIELD

Embodiments of the present disclosure relate to the technical field of computers, and in particular to a method and a device for information interaction.

BACKGROUND

With the development of computer technologies, oral practice based on computer technologies is realized with the existing technology. The oral practice herein may be speaking practice for various languages including English, French and so on.

At present, oral practice is mainly in the form of automatic scoring, in which a user reads out a template or sentence provided by a system, and then the system scores the reading of the user.

SUMMARY

A method and a device for information interaction are proposed according to the embodiments of the present disclosure.

In a first aspect, a method for information interaction is provided according to an embodiment of the present disclosure. The method includes: outputting task information indicating a target oral practice task in response to receipt of an oral practice request initiated by a user, where the task information corresponds to task intent information and task keyword information; acquiring speech information inputted by the user for the task information; recognizing the speech information to determine user intent information and user keyword information corresponding to the user; generating a matching result for indicating whether the user completes the target oral practice task, where the matching result is acquired by matching the user intent information with the task intent information and matching the user keyword information with the task keyword information to obtain the matching result; and presenting the matching result to the user.

In some embodiments, the method further includes: generating, based on the speech information and the matching result, a score for characterizing speaking ability of the user; and presenting the generated score to the user.

In some embodiments, the method further includes: outputting, in response to a matching result indicating that the user fails to complete the target oral practice task, auxiliary information for assisting the user to complete the target oral practice task; acquiring supplementary speech information inputted by the user for the auxiliary information; and generating, based on the supplementary speech information, a new matching result for indicating whether the user completes the target oral practice task.

In some embodiments, the outputting, in response to a matching result indicating that the user fails to complete the target oral practice task, auxiliary information for assisting the user to complete the target oral practice task includes: determining, in response to the matching result indicating that the user fails to complete the target oral practice task, whether an oral practice end request inputted by the user is received; and outputting, in response to failure in receiving the oral practice end request, the auxiliary information for assisting the user to complete the target oral practice task.

In some embodiments, the outputting, in response to a matching result indicating that the user fails to complete the target oral practice task, auxiliary information for assisting the user to complete the target oral practice task includes: determining, in response to the matching result indicating that the user fails to complete the target oral practice task, whether the number of times of outputting the auxiliary information for assisting the user to complete the target oral practice task is less than or equal to a preset number of times; and outputting, in response to the number of times of outputting the auxiliary information being less than or equal to the preset number of times, the auxiliary information for assisting the user to complete the target oral practice task.

In some embodiments, the outputting task information indicating a target oral practice task includes: acquiring a historical oral practice result of the user; determining the target oral practice task based on the acquired historical oral practice result; and acquiring the task information for indicating the target oral practice task, and outputting the acquired task information.

In a second aspect, a device for information interaction is provided according to an embodiment of the present disclosure. The device includes: a first output unit, a first acquisition unit, a recognition unit, a first generation unit and a first presentation unit. The first output unit is configured to output task information indicating a target oral practice task in response to receipt of an oral practice request initiated by a user. The task information corresponds to task intent information and task keyword information. The first acquisition unit is configured to acquire speech information inputted by the user for the task information. The recognition unit is configured to recognize the speech information to determine user intent information and user keyword information corresponding to the user. The first generation unit is configured to generate a matching result for indicating whether the user completes the target oral practice task. The matching result is acquired by matching the user intent information with the task intent information and matching the user keyword information with the task keyword information to obtain the matching result. The first presentation unit is configured to present the matching result to the user.

In some embodiments, the device further includes a second generation unit and a second presentation unit. The second generation unit is configured to generate, based on the speech information and the matching result, a score for characterizing speaking ability of the user. The second presentation unit is configured to present the generated score to the user.

In some embodiments, the device further includes a second output unit, a second acquisition unit and a third generation unit. The second output unit is configured to output, in response to a matching result indicating that the user fails to complete the target oral practice task, auxiliary information for assisting the user to complete the target oral practice task. The second acquisition unit is configured to acquire supplementary speech information inputted by the user for the auxiliary information. The third generation unit is configured to generate, based on the supplementary speech information, a new matching result for indicating whether the user completes the target oral practice task.

In some embodiments, the second output unit includes a first determination module and a first output module. The first determination module is configured to determine, in response to the matching result indicating that the user fails to complete the target oral practice task, whether an oral practice end request inputted by the user is received. The first output module is configured to output, in response to failure in receiving the oral practice end request, the auxiliary information for assisting the user to complete the target oral practice task.

In some embodiments, the second output unit includes a second determination module and a second output module. The second determination module is configured to determine, in response to the matching result indicating that the user fails to complete the target oral practice task, whether the number of times of outputting the auxiliary information for assisting the user to complete the target oral practice task is less than or equal to a preset number of times. The second output module is configured to output, in response to the number of times of outputting the auxiliary information being less than or equal to the preset number of times, the auxiliary information for assisting the user to complete the target oral practice task.

In some embodiments, the first output unit includes an acquisition module, a third determination module and a third output module. The acquisition module is configured to acquire a historical oral practice result of the user. The third determination module is configured to determine the target oral practice task based on the acquired historical oral practice result. The third output module is configured to acquire the task information for indicating the target oral practice task, and outputting the acquired task information.

In a third aspect, an electronic device is provided according to an embodiment of the present disclosure. The electronic device includes one or more processors and a memory. One or more programs are stored in the memory. The one or more processors, when executing the one or more programs, implement the method for information interaction according to any one of the method embodiments.

In a fourth aspect, a computer-readable medium is provided according to an embodiment of the present disclosure. The computer-readable medium stores a computer program that, when executed by a processor, implements the method for information interaction according to any one of the method embodiments.

With the method and device for information interaction according to the embodiments of the present disclosure, in response to receipt of an oral practice request initiated by a user, task information indicating a target oral practice task is outputted. The task information corresponds to task intent information and task keyword information. Then, speech information inputted by the user for the task information is acquired. Next, the speech information is recognized to determine user intent information and user keyword information corresponding to the user. Finally, the user intent information is matched with the task intent information and the user keyword information is matched with the task keyword information to generate the matching result for indicating whether the user completes the target oral practice task, and the matching result is presented to the user. In this way, oral practice can be performed in the form of task-based dialogue. Compared with the template-based oral practice in the existing technology, the solution of the present disclosure is more intelligent. Further, the user can organize the language by himself to complete the task, which facilitates flexible and efficient oral practice.

BRIEF DESCRIPTION OF THE DRAWINGS

Other features, objects and advantages of the present disclosure will become more apparent upon reading the detailed description of non-limiting embodiments taken with reference to the following drawings.

DETAILED DESCRIPTION OF EMBODIMENTS

The present disclosure is further described in detail below with reference to the drawings and embodiments. It should be understood that the specific embodiments described herein are only for explaining the related invention rather than limiting the invention. In addition, it should be noted that only parts related to the related invention are shown in the drawings for the convenience of description.

It should be noted that the embodiments of the present disclosure and the features in the embodiments may be combined with each other in case of no conflict. The present disclosure is described in detail below with reference to the drawings and in conjunction with the embodiments.

Figure 1:
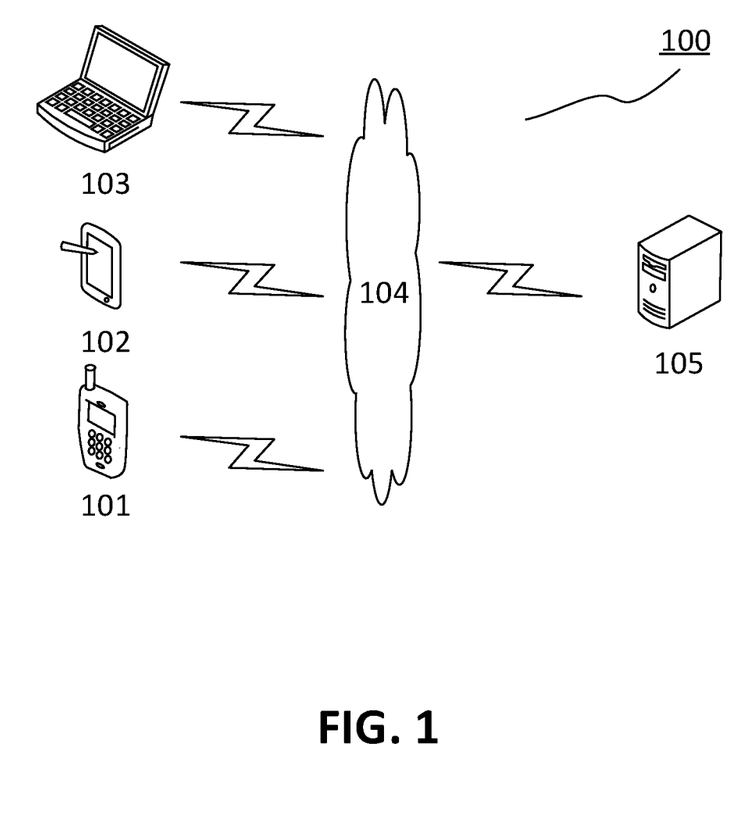
FIG. 1 is a schematic diagram illustrating a system architecture to which an embodiment of the present disclosure may be applied.

FIG. 1 illustrates a system architecture 100 to which embodiments of a method for information interaction or a device for information interaction according to the present disclosure may be applied.

As shown in FIG. 1, the system architecture 100 may include terminal devices 101, 102, and 103, a network 104 and a server 105. The network 104 is a medium for providing a communication link between the terminal devices 101, 102, 103 and the server 105. The network 104 may include various connection types, such as wired, wireless communication links, or fiber optic cables.

The user may use the terminal devices 101, 102, 103 to interact with the server 105 over the network 104 to receive or send messages and the like. The terminal devices 101, 102 and 103 may be installed with various client applications such as language teaching applications, voice interaction applications, web browser applications, search applications, instant communication tools, and social platform software.

The terminal devices 101, 102, and 103 each may be hardware or software. In case of hardware, the terminal devices 101, 102, and 103 may include various electronic devices capable of acquiring a voice, including but not limited to a smart phone, a tablet computer, an e-book reader, an MP3 (Moving Picture Experts Group Audio Layer III) player, an MP4 (Moving Picture Experts Group Audio Layer IV) player, a laptop, a desktop computer and the like. In case of hardware, the terminal devices 101, 102, and 103 may be installed in the electronic device listed above. The terminal devices 101, 102, and 103 each may be implemented as multiple software or software modules (e.g., multiple software or software modules for providing distributed services), or may be implemented as a single software or software module, which is not limited herein.

The server 105 may provide various services, for example, a background server of a language teaching application installed on the terminal devices 101, 102, and 103. The background server, in response to receipt of an oral practice request initiated by a user through the terminal devices 101, 102, 103, outputs task information of a target oral practice task, acquires speech information inputted by the user through the terminal devices 101, 102, 103, processes, for example, analyzing the received speech information and other data to obtain a processing result (e.g., a matching result for indicating whether the user completes the target oral practice task) and outputs the processing result.

It should be noted that, the method for information interaction according to the embodiment of the present disclosure may be performed by the terminal devices 101, 102, and 103, and may also be performed by the server 105. Correspondingly, the device for information interaction may be arranged in the terminal devices 101, 102, and 103, or in the server 105.

It should be noted that the server may be hardware or software. In case of hardware, the server may be implemented as a distributed server cluster consisting of multiple servers, or a single server. In case of software, the server may be implemented as multiple software or software modules (e.g., multiple software or software modules for providing distributed services), or may be implemented as a single software or software module, which is not limited herein.

It should be understood that the number of the terminal devices, the number of the network and the number of the server in FIG. 1 are only illustrative. The terminal devices, the network, and the server may vary in number as needed. In particular, if it is unnecessary to acquire the data utilized in the process of generating the matching result for indicating whether the user completes the target oral practice task from other electronic devices, the system architecture includes the terminal devices or the server only without the network.

Figure 2:
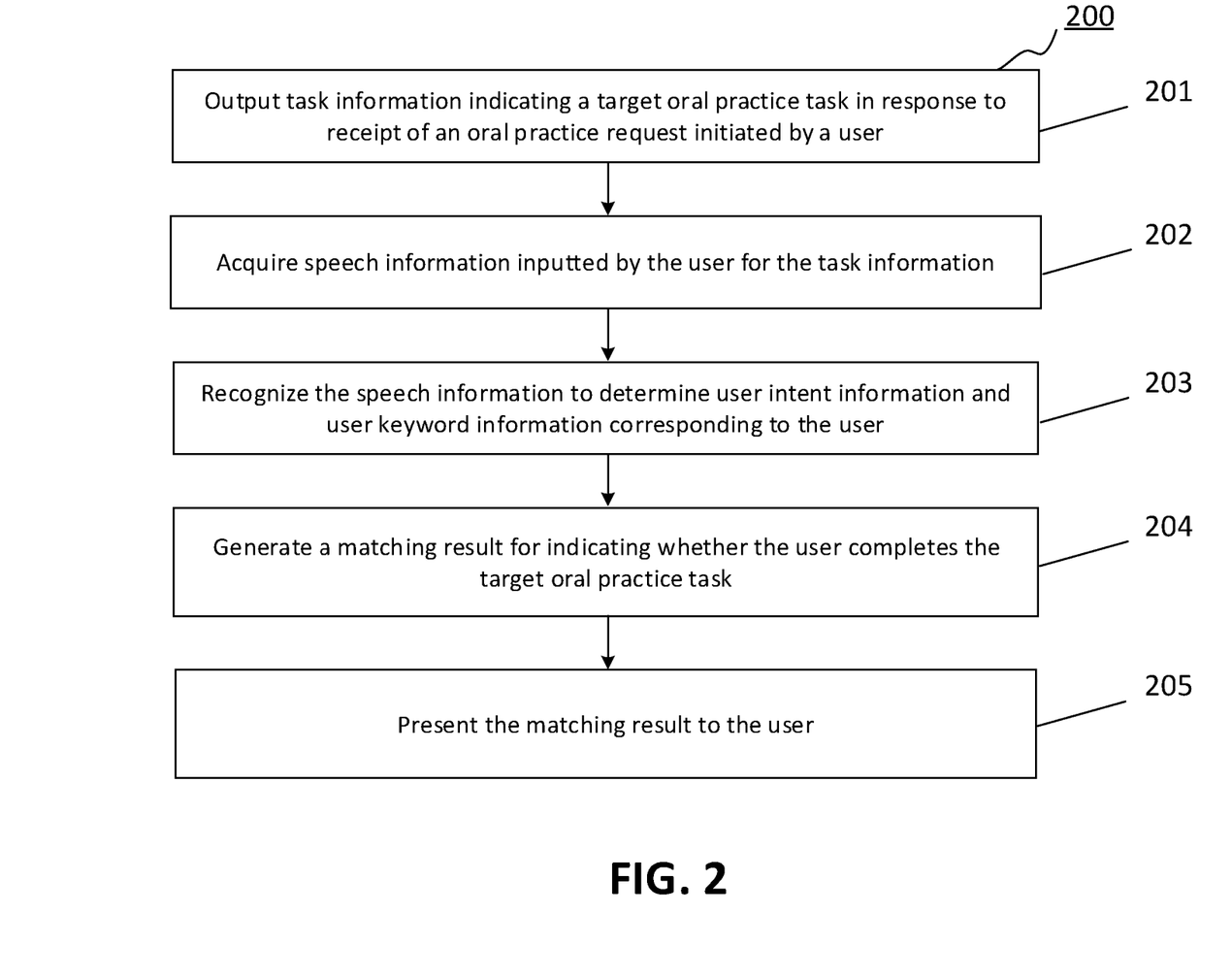
FIG. 2 is a flowchart illustrating a method for information interaction according to an embodiment of the present disclosure.

Reference is made to FIG. 2, which illustrates a flow 200 of a method for information interaction according to an embodiment of the present disclosure. The method for information interaction includes the following steps 201 to 205.

In step 201, in response to receipt of an oral practice request initiated by a user, task information indicating a target oral practice task is outputted.

In this embodiment, an execution subject of the method for information interaction (e.g., the terminal device shown in FIG. 1) may, in response to receipt of the oral practice request initiated by the user through a wired connection or a wireless connection, output the task information for indicating the target oral practice task. The oral practice request is for requesting speaking practice. The oral practice requested by the user may be speaking practice for various languages, such as English, French, and Chinese.

In practice, the user may initiate the oral practice request in various manners, such as clicking a button displayed on a page for speaking practice. Alternatively, the user may touch a preset switch for speaking practice.

In this embodiment, the execution subject may, in response to receipt of the oral practice request, output the task information for indicating the target oral practice task. The target oral practice task is an oral practice task to be completed by the user who initiates the oral practice request. The oral practice task is to be completed by the user through voice dialogue. For example, the oral practice task is a food ordering task, a self-introduction task, or an air ticket booking task. The target oral practice task may be a preset task, or a task selected by the user from multiple preset oral practice tasks.

The task information may represent content of the target oral practice task. For example, the target oral practice task is a food ordering task, and task information corresponding to the food ordering task may be "ordering a Kung Pao chicken rice dish and delivering it to Yingdu Building, Zhichun Road". The task information may be preset for the target oral practice task or generated after receiving the above oral practice request. For example, the target oral practice task is a food ordering task, the execution subject, after receiving the oral practice request, detects a current location as "Xidan Joy City" and generates task information "ordering a Kung Pao chicken rice dish and deliver it to Xidan Joy City".

In this embodiment, the task information corresponds to task intent information and task keyword information. The task intent information represents a goal of the target oral practice task. The task keyword information represents a key point of the goal. The task intent information and task keyword information may be extracted from the task information. For example, from the task information "ordering a Kung Pao chicken rice dish and deliver it to Xidan Joy City", the task intent information is extracted as "food ordering", and the task keyword information is extracted as "Kung Pao chicken rice dish; Xidan Joy City".

The task intent information and the task keyword information may be extracted from the task information in various manners. For example, in a case that the task information is preset information, the task intent information and the task keyword information are extracted from the task information in advance by a technician. Alternatively, the task intent information and the task keyword information are extracted from the task information by the existing natural language processing method.

It should be noted that in case of a user terminal, the execution subject directly detects an operation of the user, so as to receive the oral practice request initiated by the user, and output the task information to the user. In case of a server in communication with the user terminal, the execution subject receives the oral practice request sent by the user terminal, and outputs task information to the user terminal, so that the user terminal presents the task information to the user.

In some optional implementations of this embodiment, the execution subject may output the task information for indicating the target oral practice task by the following steps. First, the execution subject acquires a historical oral practice result of the user. Then, the execution subject determines the target oral practice task based on the acquired historical oral practice result. Finally, the execution subject acquires task information for indicating the target oral practice task, and outputs the acquired task information.

The historical oral practice result may be a result obtained when the user performs a historical oral practice task, for example, a score for characterizing speaking ability of the user obtained when the user performs an oral practice task previously.

In this implementation, the preset oral practice task may vary in difficulty (e.g., a degree of difficulty is indicated by a preset difficulty factor). Therefore, the execution subject determines a difficult target oral practice task (e.g., corresponding to a difficulty factor greater than a preset difficulty factor) for the user in a case that the historical oral practice result is good (e.g., a score obtained previously is greater than a preset score). The execution subject determines an easy target oral practice task (e.g., corresponding to a difficulty factor less than or equal to the preset difficulty factor) for the user in a case that the historical oral practice result is poor (e.g., a score obtained previously is less than or equal to the preset score).

In this implementation, a task that is relatively in line with the speaking ability of the user is determined for the user based on the historical oral practice result of the user, thereby facilitating effective oral practice.

In step 202, speech information inputted by the user for the task information is acquired.

In this embodiment, after the task information is outputted, the user may input the speech information for the acquired task information. Then, the execution subject may acquire the speech information inputted by the user for the task information. The speech information is information for completing the target oral practice task corresponding to the task information. It should be appreciated that the user may input the speech information in the language in which the user requests for oral practice.

In step 203, the speech information is recognized to determine user intent information and user keyword information corresponding to the user.

In this embodiment, the execution subject may recognize the speech information obtained in step 202, to determine the user intent information and the user keyword information corresponding to the user. The user intent information characterizes a goal of the user. The user keyword information characterizes a key point of the goal. For example, speech information inputted by the user is "I want to know the weather in Xiamen today". After the speech information is recognized, user intent information "inquiring about the weather" and the user keyword information "today; Xiamen" are obtained.

The execution subject may recognize the speech information by the existing natural language processing method, to obtain the user intent information and the user keyword information. For example, the execution subject first converts the speech information into text information through speech recognition, and then extracts the user intent information and the user keyword information from the converted text information through semantic recognition.

In particular, the execution subject may also translate the speech information in the process of recognizing the speech information. Therefore, the obtained user intent information and user keyword information are respectively in the same language as the task intent information and the task keyword information, thereby facilitating the subsequent matching.

In step 204, a matching result for indicating whether the user completes the target oral practice task is generated.

In this embodiment, the execution subject matches the user intent information obtained in step 203 with the task intent information obtained in step 201 and matches the user keyword information obtained in step 203 with the task keyword information obtained in step 201, to generate the matching result for indicating whether the user completes the target oral practice task.

The execution subject generates the matching result in various manners based on matching of intent information (including the user intent information and the task intent information) and matching of keyword information (including the user keyword information and the task keyword information). For example, the execution subject generates a matching result for indicating that the user completes the target oral practice task already in a case that the intent information is successfully matched and the keyword information is successfully matched, and generates a matching result for indicating that the user fails to complete the target oral practice task in the case that one of the intent information and the keyword information is unsuccessfully matched. Alternatively, the execution subject generates a matching result for indicating that the user fails to complete the target oral practice task in a case that the intent information is unsuccessfully matched and the keyword information is unsuccessfully matched, and generates a matching result for indicating that the user completes the target oral practice task already in a case that the one of the intent information and the keyword information is successfully matched.

The execution subject may perform information matching (including matching of intent information and matching of keyword information) in various manners. For example, the execution subject compares whether the two pieces of information are the same. In a case that the two pieces of information are the same, the matching is successful. Alternatively, the execution subject may perform information matching by similarity calculation. In case that a similarity between the two pieces of information is greater than or equal to a preset similarity threshold, the matching is successful.

In particular, it should be noted that during the information matching, the execution subject may first translate the information in a case that the languages respectively corresponding to the two pieces of information are different, so that the two pieces of information are in the same language. Then, the execution subject matches the two pieces of information.

It should be understood that a unique target oral practice task is determined based on the task intent information and the task keyword information. Therefore, it can be determined whether the user completes the target oral practice task by determining whether the user intent information and the user keyword information corresponding to the user match the task intent information and the task keyword information, respectively.

In step 205, the matching result is presented to the user.

In this embodiment, the execution subject may present the matching result obtained in step 204 to the user.

The execution subject may present the matching result in various forms, such as audio, image, or text. The user knows whether the task is completed based on the matching result presented by the execution subject.

In some optional implementations of this embodiment, the execution subject may further generate a score for characterizing speaking ability of the user based on the speech information and the matching result, and present the generated score to the user. Here, while presenting the matching result, the execution subject further scores the speaking ability of the user based on the matching result and the speech information of the user and presents the obtained score. The execution subject may score the speaking ability of the user based on the matching result, fluency of the speech information, accuracy of words in the speech information, and the like. A proportion of each influencing factor in the scoring process may be preset by the technician.

Figure 3:
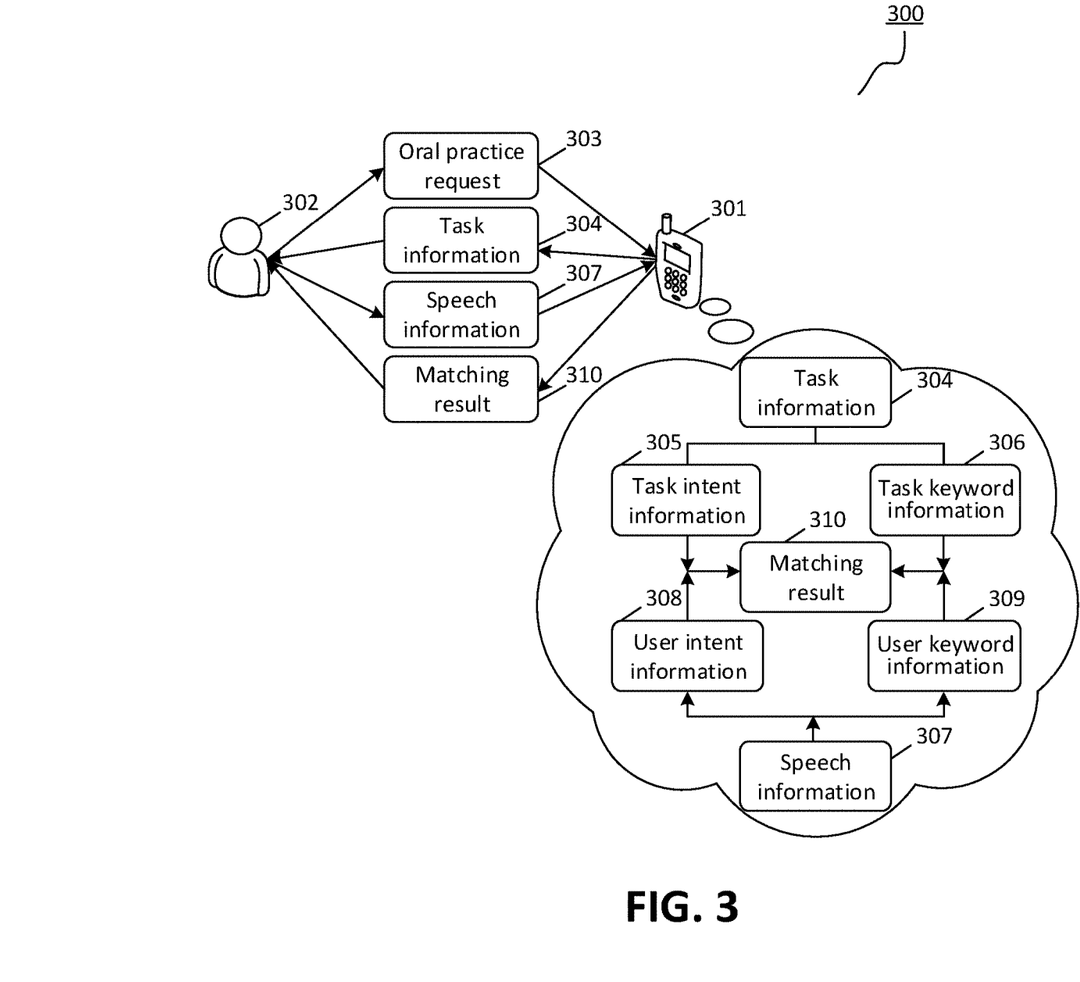
FIG. 3 is a schematic diagram illustrating an application scenario of the method for information interaction according to an embodiment of the present disclosure.

Reference is made to FIG. 3, which is a schematic diagram illustrating an application scenario of the method for information interaction according to this embodiment. In the application scenario in FIG. 3, the terminal device 301 first responds to receipt of an oral practice request 303 initiated by the user 302 and outputs task information 304 (e.g., "ordering a Kung Pao Chicken rice dish and delivering it to Yingdu Building, Zhichun Road") for indicating a target oral practice task (e.g., a food ordering task). The task information 304 corresponds to task intent information 305 (e.g., "food ordering") and task keyword information 306 (e.g., "Kung Pao Chicken rice dish; Yingdu Building, Zhichun Road"). Then, the terminal device 301 acquires speech information 307 inputted by the user 302 for the task information 304. Next, the terminal device 301 recognizes the speech information 307 to determine user intent information 308 (e.g., "food ordering") and user keyword information 309 (e.g., "Kung Pao Chicken rice dish; Yingdu Building") corresponding to the user 302. Then, the terminal device 301 matches the user intent information 308 with the task intent information 305 and matches the user keyword information 309 with the task keyword information 306, to generate a matching result 310 indicating whether the user completes the target oral practice task. Finally, the terminal device 301 presents the matching result 310 to the user 302.

With the method according to the embodiments of the present disclosure, oral practice can be performed in the form of task-based dialogue. Compared with the template-based oral practice in the existing technology, the solution of the present disclosure is more intelligent. Further, the user can organize the language by himself to complete the task, which facilitates flexible and efficient oral practice.

Figure 4:
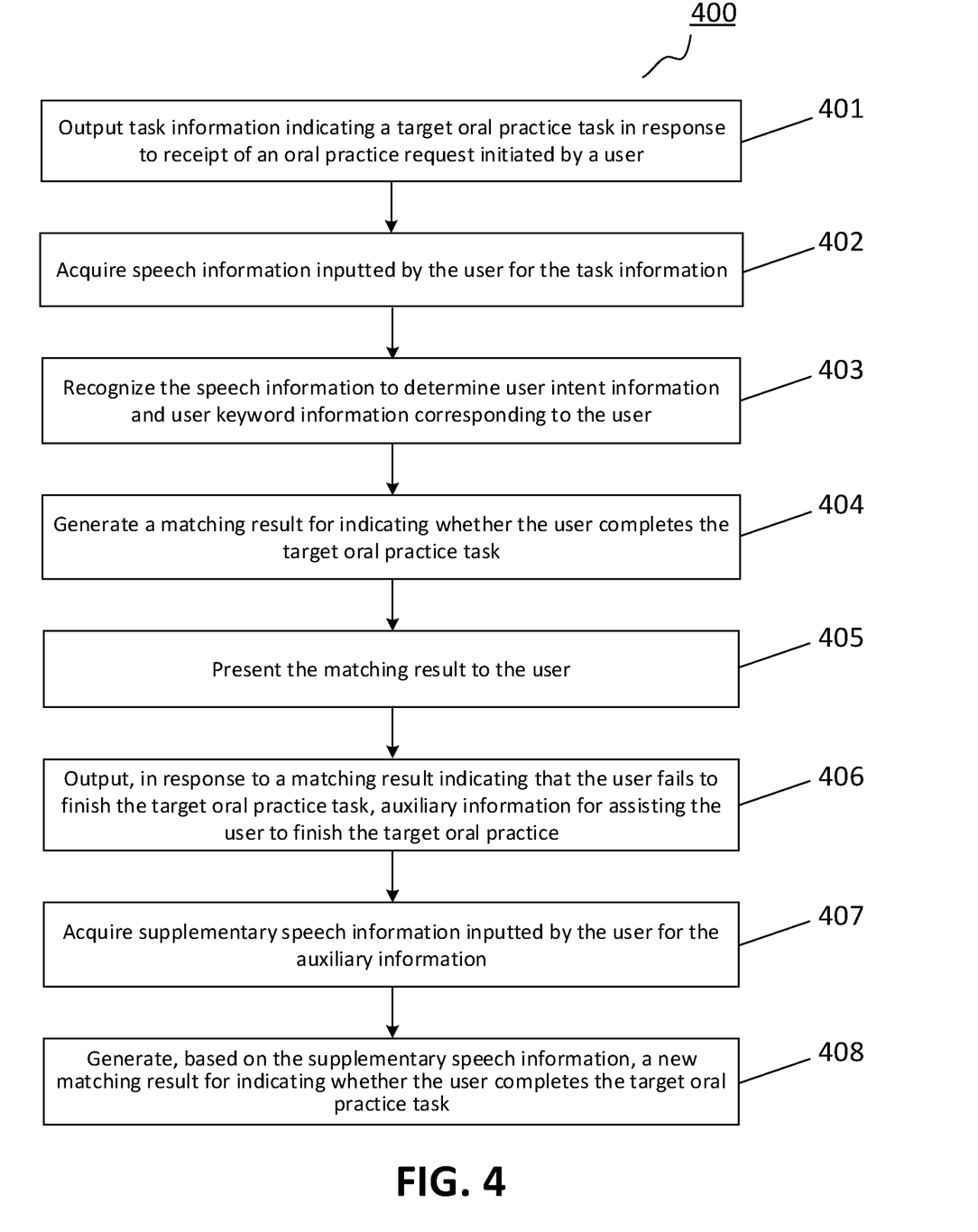
FIG. 4 is a flowchart illustrating the method for information interaction according to another embodiment of the present disclosure.

Reference is made to FIG. 4, which illustrates a flow 400 of the method for information interaction according to another embodiment. The flow 400 of the method for information interaction includes the following steps 401 to 408.

In step 401, in response to receipt of an oral practice request initiated by a user, task information indicating a target oral practice task is outputted.

In this embodiment, an execution subject of the method for information interaction (e.g., the terminal device shown in FIG. 1) may, in response to receipt of the oral practice request initiated by the user through a wired connection or a wireless connection, output the task information for indicating the target oral practice task. The oral practice request is for requesting speaking practice. The target oral practice task is an oral practice task to be completed by the user who initiates the oral practice request. The oral practice task is to be completed by the user through voice dialogue. The task information may represent content of the target oral practice task.

In this embodiment, the task information corresponds to task intent information and task keyword information. The task intent information represents a goal of the target oral practice task. The task keyword information represents a key point of the goal. The task intent information and task keyword information may be extracted from the task information.

In step 402, speech information inputted by the user for the task information is acquired.

In this embodiment, after the task information is outputted, the user may input the speech information for the acquired task information. Then, the execution subject may acquire the speech information inputted by the user for the task information. The speech information is information for completing the target oral practice task corresponding to the task information. It should be appreciated that the user may input the speech information in the language in which the user requests for oral practice.

In step 403, the speech information is recognized to determine user intent information and user keyword information corresponding to the user.

In this embodiment, the execution subject may recognize the speech information obtained in step 402, to determine the user intent information and the user keyword information corresponding to the user. The user intent information characterizes a goal of the user. The user keyword information characterizes a key point of the goal.

In step 404, a matching result for indicating whether the user completes the target oral practice task is generated.

In this embodiment, the execution subject matches the user intent information obtained in step 403 with the task intent information obtained in step 401 and matches the user keyword information obtained in step 403 with the task keyword information obtained in step 401, to generate the matching result for indicating whether the user completes the target oral practice task.

In step 405, the matching result is presented to the user.

In this embodiment, the execution subject may present the matching result obtained in step 404 to the user.

The steps 401, 402, 403, 404, and 405 may be performed in a manner similar to the steps 201, 202, 203, 204 and 205 in the foregoing embodiments, respectively. The above descriptions for the steps 201, 202, 203, 204 and 205 are respectively applicable to the steps 401, 402, 403, 404, and 405, and thus the steps 401, 402, 403, 404, and 405 are not described in detail here.

In step 406, in response to a matching result indicating that the user fails to complete the target oral practice task, auxiliary information for assisting the user to complete the target oral practice task is outputted.

In this embodiment, the execution subject may output the auxiliary information for assisting the user to complete the target oral practice task in response to the matching result obtained in step 404 indicating that the user fails to complete the target oral practice task. The auxiliary information may be information generated for user information (user intent information and/or user keyword information) that does not match the task information (task intent information and/or task keyword information). The auxiliary information is for guiding the user to input information that matches the task information.

For example, the target oral practice task is a food ordering task. The execution subject, after matching based on the speech information the user intent information with the task intent information as well as the user keyword information with the task keyword information, determines that order address information in the user keyword information does not match order address information in the task keyword information, and generates auxiliary information "please input the correct order address".

In some optional implementations of this embodiment, the execution subject determines, in response to the matching result indicating that the user fails to complete the target oral practice task, whether an oral practice end request inputted by the user is received, and outputs, in response to failure in receiving the oral practice end request, the auxiliary information for assisting the user to complete the target oral practice task. The oral practice end request is for requesting an end of this oral practice.

In practice, the user may want to obtain a matching result only rather than complete the oral practice task. Therefore, outputting the auxiliary information after the matching result may result in user disgust. In this implementation, the operation of outputting the auxiliary information is controlled by the user. No auxiliary information is outputted in response to the oral practice end request inputted by the user, and the auxiliary information is outputted in a case that the user does not input an oral practice end request. In this way, flexibility of oral practice can be improved while improving integrity of the oral practice.

In step 407, supplementary speech information inputted by the user for the auxiliary information is acquired.

In this embodiment, after outputting the auxiliary information, the execution subject acquires the supplementary speech information inputted by the user for the auxiliary information. The supplementary speech information may be speech information inputted by the user after obtaining the auxiliary information and for supplementing the speech information inputted in step 402.

For example, after matching the user intent information and the user keyword information corresponding to the speech information obtained in step 402 respectively, the execution subject determines that the order address information in the user keyword information does not match the order address information ("Yingdu Building") in the task keyword information, and generates the auxiliary information "please input the correct order address". Then, the user inputs the supplementary speech information "Yingdu Building" for the auxiliary information.

In step 408, based on the supplementary speech information, a new matching result for indicating whether the user completes the target oral practice task is generated.

In this embodiment, based on the supplementary speech information obtained in step 407, the execution subject generates the new matching result for indicating whether the user completes the target oral practice task.

The auxiliary information is generated for information (including intent information and keyword information) of unsuccessful matching, and the supplementary speech information is inputted for the auxiliary information. Therefore, the execution subject only matches the supplementary speech information with the task information (including the task intent information and the task keyword information) that has not been successfully matched. Information not involved in the supplementary speech information is the information that is successfully matched.

In a case that the intent information is not successfully matched, the execution subject may first recognize the supplementary speech information to obtain supplementary intent information, and then match the supplementary intent information with the task intent information to obtain a new matching result. In a case that the keyword information is not successfully matched, the execution subject may first recognize the supplementary speech information to obtain supplementary keyword information, and then match the supplementary keyword information with the task keyword information to obtain a new matching result.

In the above example, after the user inputs the supplementary speech information "Yingdu Building" for the auxiliary information "please input the correct order address", the execution subject recognizes the speech information "Yingdu Building" to obtain text information "Yingdu Building", and then matches the text information "Yingdu Building" with the order address information "Yingdu Building" in the task keyword information to obtain a new matching result that indicates the user completes the target oral practice task already.

Optionally, in a case that the target oral practice task is still not completed after the user inputs the supplementary speech information (that is, the new matching result indicates that the user fails to complete the target oral practice task), the execution subject may further output auxiliary information based on information that is not matched successfully, so as to further guide the user to complete the target oral practice task.

In some optional implementations of this embodiment, the execution subject may determine, in response to the matching result indicating that the user fails to complete the target oral practice task, whether the number of times of outputting the auxiliary information for assisting the user to complete the target oral practice task is less than or equal to a preset number of times. The execution subject outputs, in response to the number of times of outputting the auxiliary information being less than or equal to the preset number of times, auxiliary information for assisting the user to complete the target oral practice task.

In this implementation, the number of times of outputting the auxiliary information is limited, thereby reducing a possibility of user disgust due to excessive auxiliary information. In addition, since device resources are consumed for outputting the auxiliary information, limiting the number of times of outputting the auxiliary information also helps to reduce the consumption of device resources.

As can be seen from FIG. 4, compared with the embodiment illustrated in FIG. 2, the flow 400 of the method for information interaction in this embodiment highlights that the auxiliary information for assisting the user to complete the target oral practice task is outputted in a case that the matching result indicates that the user fails to complete the target oral practice task. Therefore, the solution described in this embodiment can guide the user to complete the target oral practice task by outputting the auxiliary information. In this way, the integrity of oral practice can be improved, and oral teaching performance in the process of oral practice can be improved.

Figure 5:
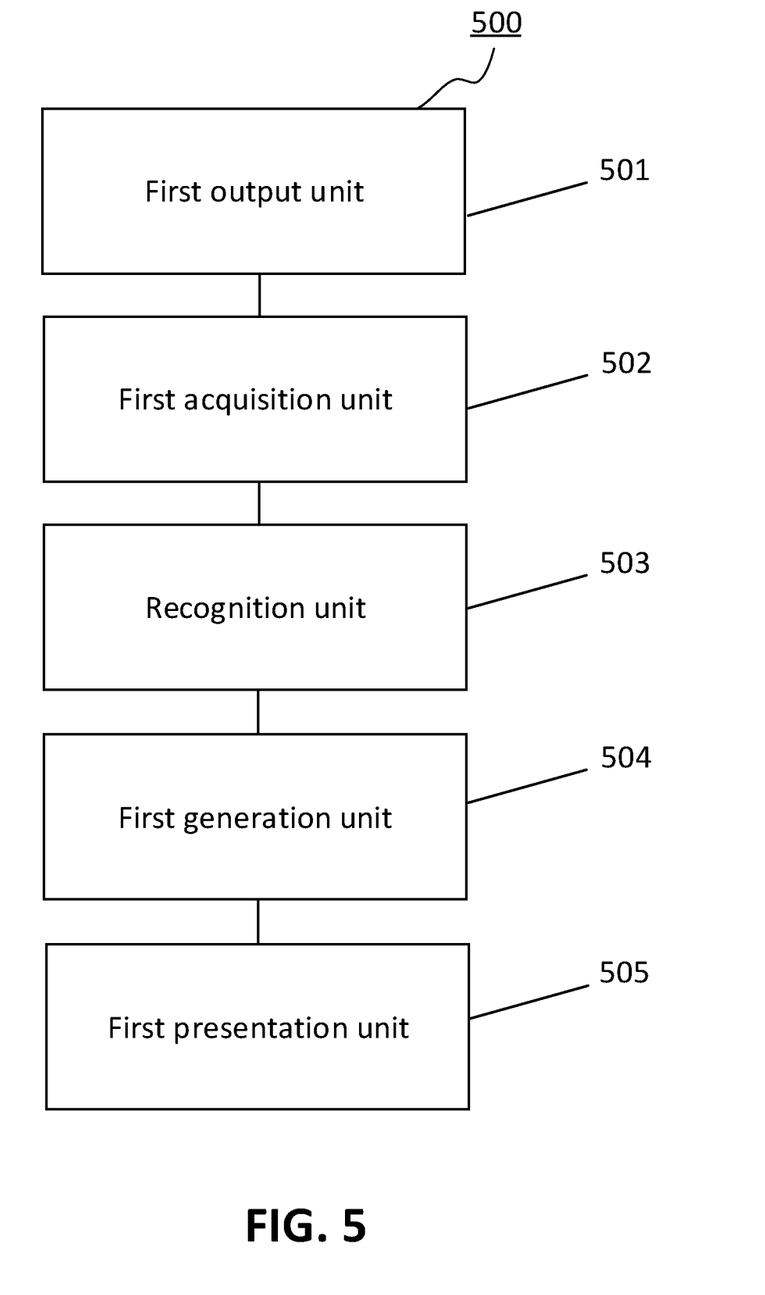
FIG. 5 is a schematic structural diagram illustrating a device for information interaction according to an embodiment of the present disclosure.

Referring to FIG. 5, a device for information interaction is provided according to an embodiment of the present disclosure, as an implementation of the method shown in the drawings. This device embodiment corresponds to the method embodiment shown in FIG. 2. The device for information interaction is appliable various electronic devices.

As shown in FIG. 5, a device 500 for information interaction in this embodiment includes: a first output unit 501, a first acquisition unit 502, a recognition unit 503, a first generation unit 504 and a first presentation unit 505. The first output unit 501 is configured to output, in response to receipt of an oral practice request initiated by a user, task information indicating a target oral practice task. The task information corresponds to task intent information and task keyword information. The first acquisition unit 502 is configured to acquire speech information inputted by the user for the task information. The recognition unit 503 is configured to recognize the speech information to determine user intent information and user keyword information corresponding to the user. The first generation unit 504 is configured to generate a matching result for indicating whether the user completes the target oral practice task. The matching result is acquired by: matching the user intent information with the task intent information and matching the user keyword information with the task keyword information to obtain the matching result. The first presentation unit 505 is configured to present the matching result to the user.

In this embodiment, the first output unit 501 of the device 500 for information interaction may output, in response to receipt of the oral practice request initiated by the user through a wired connection or a wireless connection, the task information for indicating the target oral practice task. The oral practice request is for requesting speaking practice. The target oral practice task is an oral practice task to be completed by the user who initiates the oral practice request. The oral practice task is to be completed by the user through voice dialogue. The task information may represent content of the target oral practice task.

In this embodiment, the task information corresponds to task intent information and task keyword information. The task intent information represents a goal of the target oral practice task. The task keyword information represents a key point of the goal. The task intent information and task keyword information may be extracted from the task information.

In this embodiment, after the first output unit 501 outputs the task information, the user may input speech information for the acquired task information, and then the first acquisition unit 502 acquires the speech information inputted by the user for the task information. The speech information is information for completing the target oral practice task corresponding to the task information. It should be appreciated that the user may input the speech information in the language in which the user requests for oral practice.

In this embodiment, the recognition unit 503 recognizes the speech information obtained by the first acquisition unit 502 to determine the user intent information and the user keyword information corresponding to the user. The user intent information characterizes a goal of the user. The user keyword information characterizes a key point of the goal.

In this embodiment, the first generation unit 504 may match the user intent information obtained by the recognition unit 503 with the task intent information obtained by the first output unit 501 and match the user keyword information obtained by the recognition unit 503 with the task keyword information obtained by the first output unit 501, to generate the matching result for indicating whether the user completes the target oral practice task.

In this embodiment, the first presentation unit 505 may present the matching result obtained by the first generation unit 504 to the user.

In some optional implementations of this embodiment, the device 500 further includes a second generation unit and a second presentation unit (that are not shown in the drawings). The second generation unit is configured to generate a score for characterizing speaking ability of the user based on the speech information and the matching result. The second presentation unit is configured to present the generated score to the user.

In some optional implementations of this embodiment, the device 500 further includes: a second output unit, a second acquisition unit, and a third generation unit (that are not shown in the drawings). The second output unit is configured to output, in response to a matching result indicating that the user fails to complete the target oral practice task, auxiliary information for assisting the user to complete the target oral practice task. The second acquisition unit is configured to acquire supplementary speech information inputted by the user for the auxiliary information. The third generation unit is configured to generate, based on the supplementary speech information, a new matching result for indicating whether the user completes the target oral practice task.

In some optional implementations of this embodiment, the second output unit includes a first determination module and a first output module (that are not shown in the drawings). The first determination module is configured to determine, in response to the matching result indicating that the user fails to complete the target oral practice task, whether an oral practice end request inputted by the user is received. The first output module is configured to output, in response to failure in receiving the oral practice end request, the auxiliary information for assisting the user to complete the target oral practice task.

In some optional implementations of this embodiment, the second output unit includes a second determination module and a second output module (that are not shown in the drawings). The second determination module is configured to determine, in response to the matching result indicating that the user fails to complete the target oral practice task, whether the number of times of outputting the auxiliary information for assisting the user to complete the target oral practice task is less than or equal to a preset number of times. The second output module is configured to output, in response to the number of times of outputting the auxiliary information being less than or equal to the preset number of times, the auxiliary information for assisting the user to complete the target oral practice task.

In some optional implementations of this embodiment, the first output unit 501 includes an acquisition module, a third determination module and a third output module (that are not shown in the drawings). The acquisition module is configured to acquire a historical oral practice result of the user. The third determination module is configured to determine the target oral practice task based on the acquired historical oral practice result. The third output module is configured to acquire the task information for indicating the target oral practice task, and output the acquired task information.

It should be understood that the units in the device 500 correspond to the respective steps in the method described with reference to FIG. 2. Therefore, the operations, features and beneficial effects described above with respect to the method are applicable to the device 500 and the units included therein, and details are not described here again.

The device 500 according to the embodiment of the present disclosure may perform oral practice in the form of task-based dialogue. Compared with the template-based oral practice in the existing technology, the solution of the present disclosure is more intelligent. Further, the user can organize the language by himself to complete the task, which facilitates flexible and efficient oral practice.

Figure 6:
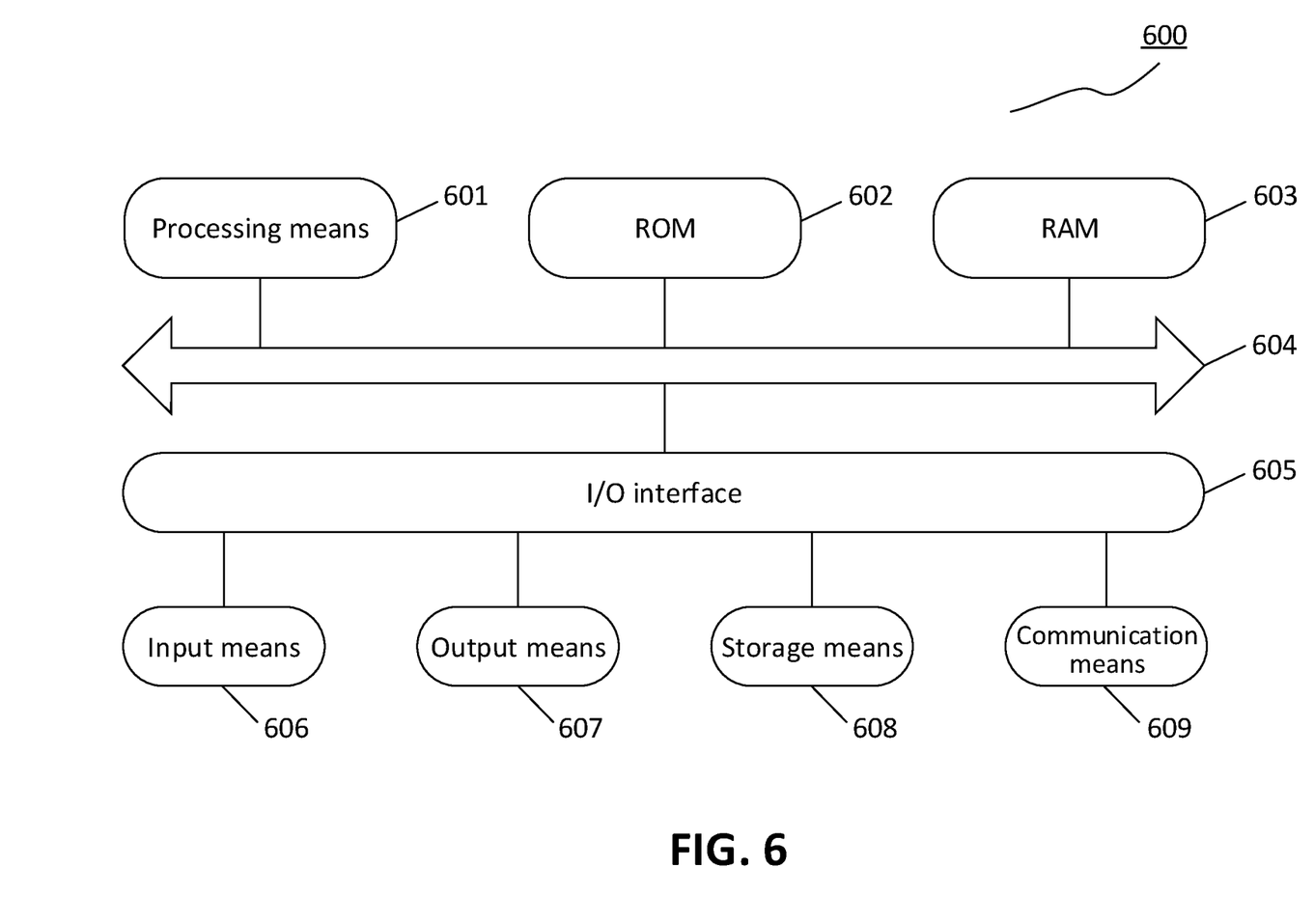
FIG. 6 is a schematic structural diagram illustrating a computer system suitable for implementing an electronic device according to an embodiment of the present disclosure.

Reference is made to FIG. 6, which is a schematic structural diagram illustrating an electronic device (e.g., the terminal device in FIG. 1) 600 suitable for implementing the embodiments of the present disclosure. The terminal device in the embodiments of the present disclosure may include but is not limited to a mobile terminal such as a mobile phone, a notebook computer, a digital broadcast receiver, a PDA (personal digital assistant), a PAD (tablet), a PMP (portable multimedia player), and an in-vehicle terminal (e.g., in-vehicle navigation terminal) as well as a stationary terminal such as a digital TV and a desktop computer. The electronic device shown in FIG. 6 is only an example, and should not impose any limitation on the function and scope of use of the embodiments of the present disclosure.

As shown in FIG. 6, the electronic device 600 may include a processing means (e.g., a central processing unit, or a graphics processing unit) 601. The processing means 601 may perform various appropriate actions and processing according to a program stored in a read only memory (ROM) 602 or a program loaded from a storage means 608 into a random-access memory (RAM) 603. In the RAM 603, various programs and data necessary for the operation of the electronic device 600 are also stored. The processing means 601, the ROM 602, and the RAM 603 are connected to each other via a bus 604. An input/output (I/O) interface 605 is also connected to the bus 604.

Generally, the following means may be connected to the I/O interface 605: an input means 606 including, for example, a touch screen, a touch pad, a keyboard, a mouse, a camera, a microphone, an accelerometer and a gyroscope; an output means 607 including, for example, a liquid crystal display (LCD), a speaker and a vibrator; a storage means 608 including, for example, a tape and a hard disk; and a communication means 609. The communication means 609 may allow the electronic device 600 to communicate wirelessly or by wire with other devices so as to exchange data. Although FIG. 6 shows the electronic device 600 having various means, it should be understood that the electronic device 600 is unnecessary to implement or have all of the illustrated means. Alternatively, the electronic device 600 may implement or be equipped with more or fewer means.

In particular, according to embodiments of the present disclosure, the processes described above with reference to the flowcharts may be implemented as computer software programs. For example, a computer program product is provided according to embodiments according to the present disclosure. The computer program product includes a computer program carried on a computer readable medium. The computer program contains program code for carrying out the method shown in the flowchart. In such embodiments, the computer program may be downloaded and installed from the network via the communication means 609, or installed from the storage means 608 or the ROM 602. When the computer program is executed by the processing means 601, the functions defined in the method of the embodiments of the present disclosure are implemented.

It should be noted that the computer-readable medium described in the present disclosure may be a computer-readable signal medium or a computer-readable storage medium, or any combination of the above two. The computer-readable storage medium may include but is not limited to electrical, magnetic, optical, electromagnetic, infrared, or semiconductor systems, apparatuses, or devices, or a combination of any of the above, for example. More detailed examples of the computer-readable storage medium may include but are not limited to an electrical connection with one or more wires, a portable computer disk, a hard disk, a random-access memory (RAM), a read only memory (ROM), an erasable programmable read only memory (EPROM or a flash memory), an optical fiber, a portable compact disk read only memory (CD-ROM), an optical storage device, a magnetic storage device, or any suitable combination of the above. In the present disclosure, the computer-readable storage medium may be any tangible medium that contains or stores a program. The program may be used by or in conjunction with an instruction execution system, apparatus or device. In the present disclosure, however, the computer-readable signal medium may include a data signal broadcasted in a baseband or as part of a carrier wave with computer-readable program code embodied thereon. Such broadcasted data signal may be in variety of forms, including but not limited to an electromagnetic signal, an optical signal, or any suitable combination of the foregoing. The computer-readable signal medium may be any computer-readable medium other than the computer-readable storage medium. The computer-readable signal medium may send, broadcast, or transmit the program for use by or in connection with the instruction execution system, apparatus, or device. The program code embodied on the computer readable medium may be transmitted by any suitable medium including, but not limited to, an electrical wire, an optical fiber cable, RF (radio frequency), or any suitable combination of the foregoing.

The computer-readable medium may be included in the electronic device, or exist alone without being assembled into the electronic device. The computer-readable medium carries one or more programs. The electronic device, when executing the one or more programs: outputs task information indicating a target oral practice task in response to receipt of an oral practice request initiated by a user, where the task information corresponds to task intent information and task keyword information; acquires speech information inputted by the user for the task information; recognizes the speech information to determine user intent information and user keyword information corresponding to the user; generates a matching result for indicating whether the user completes the target oral practice task, where the matching result is acquired by: matching the user intent information with the task intent information and matching the user keyword information with the task keyword information to obtain the matching result; and presents the matching result to the user.

The computer program code for carrying out operations of the present disclosure may be written in one or more programming languages, or a combination thereof. The programming languages include object-oriented programming languages, such as Java, Smalltalk, C++, and conventional procedural programming languages, such as the "C" language or similar programming languages. The program code may be executed entirely on a user computer, partly on a user computer, as a stand-alone software package, partly on a user computer and partly on a remote computer, or entirely on a remote computer or server. In the case of a remote computer, the remote computer may be connected to the user computer through any kind of network, including a local area network (LAN) or a wide area network (WAN). Alternatively, the remote computer may be connected to an external computer (e.g., over the Internet provided by the Internet service provider).

The flowcharts and block diagrams in the drawings illustrate the architecture, functionality, and operation of possible implementations of the system, the method and the computer program product according to various embodiments of the present disclosure. In this regard, each block in the flowcharts or block diagrams may represent a module, a program segment, or a portion of code. The module, program segment, or portion of code contains one or more executable instructions for implementing specified logical functions. It should also be noted that, in some alternative implementations, the functions illustrated in the blocks may be implemented in an order different from the order illustrated in the drawings. For example, two blocks shown in succession may, in fact, be implemented substantially concurrently, or in a reverse order, depending on the functionality involved. It should further be noted that each block in the block diagrams and/or flowcharts and a combination of blocks in the block diagrams and/or flowcharts may be implemented in special purpose hardware-based system that performs the specified functions or operations, or may be implemented in a combination of special purpose hardware and computer instructions.

The units involved in the embodiments of the present disclosure may be implemented by software or hardware. The name of a unit does not, in any case, qualify the unit itself. For example, the first output unit may also be described as "a unit for outputting task information".

The above description illustrates merely preferred embodiments of the present disclosure and the technical principles employed in the present disclosure. Those skilled in the art should understand that the scope of disclosure involved in the present disclosure should cover other technical solutions formed by any combination of the above technical features or their equivalents without departing from the above disclosed concept, for example, a technical solution formed by replacing the feature with (but not limited to) a technical feature with similar functions disclosed herein, rather than be limited to the technical solutions formed by the specific combination of the technical features.

The invention claimed is:

1. A method for information interaction, comprising:
   outputting task information indicating a target task to be completed through a voice dialogue in response to receipt of an oral practice request initiated by a user;
   extracting task intent information and task keyword information from the task information, wherein the task intent information represents a goal of the target task, and the task keyword information comprises at least one key word in the task information;
   acquiring speech information inputted by the user for the task information;
   recognizing the speech information to determine user intent information and user keyword information corresponding to the user, wherein the user intent information characterizes a goal of the speech information, and the user keyword information comprises at least one key word in the speech information;
   generating a matching result based on determining whether the user intent information matches the task intent information and whether the user keyword information matches the task keyword information, wherein the matching result indicates whether the user completes the target task through the speech information inputted by the user; and
   presenting the matching result to the user.

2. The method according to claim 1, further comprising:
   generating, based on the speech information and the matching result, a score for characterizing speaking ability of the user; and
   presenting the generated score to the user.

3. The method according to claim 1, further comprising:
   outputting, in response to a matching result indicating that the user fails to complete the target task, auxiliary information for assisting the user to complete the target task;
   acquiring supplementary speech information inputted by the user for the auxiliary information; and
   generating, based on the supplementary speech information, a new matching result for indicating whether the user completes the target task.

4. The method according to claim 3, wherein the outputting, in response to a matching result indicating that the user fails to complete the target task, auxiliary information for assisting the user to complete the target task comprises:
   determining, in response to the matching result indicating that the user fails to complete the target task, whether an oral practice end request inputted by the user is received; and
   outputting, in response to failure in receiving the oral practice end request, the auxiliary information for assisting the user to complete the target task.

5. The method according to claim 3, wherein the outputting, in response to a matching result indicating that the user fails to complete the target task, auxiliary information for assisting the user to complete the target task comprises:
   determining, in response to the matching result indicating that the user fails to complete the target task, whether the number of times of outputting the auxiliary information for assisting the user to complete the target task is less than or equal to a preset number of times; and
   outputting, in response to the number of times of outputting the auxiliary information being less than or equal to the preset number of times, the auxiliary information for assisting the user to complete the target task.

6. The method according to claim 1, wherein the outputting task information indicating a target task to be completed through a voice dialogue further comprises:
   acquiring a historical oral practice result of the user;
   determining the target task based on the acquired historical oral practice result; and
   acquiring the task information for indicating the target, and outputting the acquired task information.

7. A device for information interaction, comprising:
   at least one processor; and
   at least one memory communicatively coupled to the at least one processor and storing instructions that upon execution by the at least one device cause the device to:
   output task information indicating a target task to be completed through a voice dialogue in response to receipt of an oral practice request initiated by a user, wherein the task information corresponds to task intent information and task keyword information;
   extract task intent information and task keyword information from the task information, wherein the task intent information represents a goal of the target task, and the task keyword information comprises at least one key word in the task information;
   acquire speech information inputted by the user for the task information;
   recognize the speech information to determine user intent information and user keyword information corresponding to the user, wherein the user intent information characterizes a goal of the speech information, and the user keyword information comprises at least one key word in the speech information;
   generate a matching result based on determining whether the user intent information matches the task intent information and whether the user keyword information matches the task keyword information, wherein the matching result indicates whether the user completes the target task through the speech information inputted by the user; and
   present the matching result to the user.

8. The device according to claim 7, the at least one memory further storing instructions that upon execution by the at least one processor cause the device to:
   generate, based on the speech information and the matching result, a score for characterizing speaking ability of the user; and
   present the generated score to the user.

9. The device according to claim 7, the at least one memory further storing instructions that upon execution by the at least one processor cause the device to:
- output, in response to a matching result indicating that the user fails to complete the target task, auxiliary information for assisting the user to complete the target task;
- acquire supplementary speech information inputted by the user for the auxiliary information; and
- generate, based on the supplementary speech information, a new matching result for indicating whether the user completes the target task.

10. The device according to claim 8, the at least one memory further storing instructions that upon execution by the at least one processor cause the device to:
- determine, in response to the matching result indicating that the user fails to complete the target task, whether an oral practice end request inputted by the user is received; and
- output, in response to failure in receiving the oral practice end request, the auxiliary information for assisting the user to complete the target task.

11. The device according to claim 8, the at least one memory further storing instructions that upon execution by the at least one processor cause the device to:
- determine, in response to the matching result indicating that the user fails to complete the target task, whether the number of times of outputting the auxiliary information for assisting the user to complete the target oral practice task is less than or equal to a preset number of times; and
- output, in response to the number of times of outputting the auxiliary information being less than or equal to the preset number of times, the auxiliary information for assisting the user to complete the target task.

12. The device according to claim 7, the at least one memory further storing instructions that upon execution by the at least one processor cause the device to:
- acquire a historical oral practice result of the user;
- determine the target task based on the acquired historical oral practice result; and
- acquire the task information for indicating the target task, and outputting the acquired task information.

13. A computer-readable non-transitory medium storing a computer program, wherein the computer program, when executed by a processor, causes the processor to:
- output task information indicating a target task to be completed through a voice dialogue in response to receipt of an oral practice request initiated by a user;
- extract task intent information and task keyword information from the task information, wherein the task intent information represents a goal of the target task, and the task keyword information comprises at least one key word in the task information;
- acquire speech information inputted by the user for the task information;
- recognize the speech information to determine user intent information and user keyword information corresponding to the user, wherein the user intent information characterizes a goal of the speech information, and the user keyword information comprises at least one key word in the speech information;
- generate a matching result based on determining whether the user intent information matches the task intent information and whether the user keyword information matches the task keyword information, wherein the matching result indicates whether the user completes the target task through the speech information inputted by the user; and
- present the matching result to the user.

14. The computer-readable non-transitory medium according to claim 13, wherein the computer program, when executed by the processor, further causes the processor to:
- generate, based on the speech information and the matching result, a score for characterizing speaking ability of the user; and
- present the generated score to the user.

15. The computer-readable non-transitory medium according to claim 13, wherein the computer program, when executed by the processor, further causes the processor to:
- output, in response to a matching result indicating that the user fails to complete the target task, auxiliary information for assisting the user to complete the target task;
- acquire supplementary speech information inputted by the user for the auxiliary information; and
- generate, based on the supplementary speech information, a new matching result for indicating whether the user completes the target task.

16. The computer-readable non-transitory medium according to claim 13, wherein the computer program, when executed by the processor, further causes the processor to:
- acquire a historical oral practice result of the user;
- determine the target task based on the acquired historical oral practice result; and
- acquire the task information for indicating the target task, and outputting the acquired task information.

* * * * *